US012093165B2

(12) United States Patent
Mola

(10) Patent No.: US 12,093,165 B2
(45) Date of Patent: Sep. 17, 2024

(54) AUTOMATED ROOT CAUSE IDENTIFICATION USING DATA FLOW ANALYSIS OF PLURAL EXECUTION TRACES

(71) Applicant: Microsoft Technology Licensing, LLC, Redmond, WA (US)

(72) Inventor: Jordi Mola, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/557,425

(22) PCT Filed: May 2, 2022

(86) PCT No.: PCT/US2022/072038
§ 371 (c)(1),
(2) Date: Oct. 26, 2023

(87) PCT Pub. No.: WO2022/236243
PCT Pub. Date: Nov. 10, 2022

(65) Prior Publication Data
US 2024/0220397 A1 Jul. 4, 2024

(30) Foreign Application Priority Data

May 6, 2021 (LU) .................................. LU500132

(51) Int. Cl.
*G06F 9/44* (2018.01)
*G06F 11/36* (2006.01)
(52) U.S. Cl.
CPC ...... *G06F 11/3636* (2013.01); *G06F 11/3644* (2013.01)

(58) Field of Classification Search
CPC .................. G06F 11/3636; G06F 11/3644
See application file for complete search history.

(56) References Cited

U.S. PATENT DOCUMENTS

2002/0062463 A1* 5/2002 Hines ..................... G06F 9/4488
714/E11.21
2012/0304153 A1* 11/2012 Li ............................ G06F 8/75
717/123

(Continued)

OTHER PUBLICATIONS

"Search Report and Written Opinion Issued in Luxembourg Patent Application No. LU500132", Mailed Date: Feb. 2, 2022, 12 Pages.

(Continued)

*Primary Examiner* — Hang Pan
(74) *Attorney, Agent, or Firm* — Workman Nydegger

(57) ABSTRACT

Automated root cause identification using data flow analysis of plural execution traces. A computer system generates data flow dependency graphs from first and second execution traces an entity. These graphs represent input/output data flows of corresponding executions of the entity. The computer system generates topological sortings of those graphs and identifies output pairings across these graphs based on outputs having common labels and topological correspondence. The computer system identifies output pairing(s) that are mismatched as having different values and, for at least one mismatched output pairing, traverses the graphs in order to identify input pairing(s) that are topological root(s) to the mismatched output pairing(s) and that are causal to the mismatch(es). Each input pairing comprises inputs that have a common label, a common topological correspondence, and mismatched values. The computer system returns these input pairings as a root cause for at least one difference between first and second execution traces.

15 Claims, 13 Drawing Sheets

(56) References Cited

U.S. PATENT DOCUMENTS

| | | |
|---|---|---|
| 2018/0060214 A1 | 3/2018 | Mola |
| 2018/0189389 A1* | 7/2018 | Baldini Soares ... G06F 16/9024 |
| 2020/0257614 A1 | 8/2020 | Davis et al. |
| 2021/0049090 A1 | 2/2021 | Mola |
| 2021/0216438 A1* | 7/2021 | Mola .................. G06F 11/3664 |

OTHER PUBLICATIONS

"International Search Report and Written Opinion Issued in PCT Application No. PCT/US22/072038", Mailed Date: Jun. 13, 2022, 16 Pages.

\* cited by examiner

AUTOMATED ROOT CAUSE IDENTIFICATION USING DATA FLOW ANALYSIS OF PLURAL EXECUTION TRACES

CROSS-REFERENCE TO RELATED APPLICATIONS

The present application is a U.S. National Stage of International Application No. PCT/US2022/072038, filed on 2 May 2022, designating the United States and claiming the priority of Luxembourg Patent Application No. LU500132 filed with the Luxembourg Intellectual Property Office on 6 May 2021. All of the aforementioned applications are incorporated herein in their respective entireties by this reference.

TECHNICAL FIELD

The present disclosure relates to systems, methods, and devices that analyze replayable execution traces for identification of execution behaviors.

BACKGROUND

Tracking down and correcting undesired software behaviors is a core activity in software development. Undesired software behaviors can include many things, such as execution crashes, runtime exceptions, slow execution performance, incorrect data results, data corruption, and the like. Undesired software behaviors are triggered by a vast variety of factors such as data inputs, user inputs, race conditions (e.g., when accessing shared resources), etc. Given the variety of triggers, undesired software behaviors are often rare and seemingly random, and extremely difficult to reproduce. As such, it is often very time-consuming and difficult for a developer to identify a given undesired software behavior. Once an undesired software behavior has been identified, it is again often time-consuming and difficult to determine its root cause (or causes).

Developers use a variety of approaches to identify undesired software behaviors, and to then identify one or more locations in an application's code that cause the undesired software behavior. For example, developers often test different portions of an application's code against different inputs (e.g., unit testing). As another example, developers often reason about execution of an application's code in a debugger (e.g., by setting breakpoints/watchpoints, by stepping through lines of code, etc. as the code executes). As another example, developers often observe code execution behaviors (e.g., timing, coverage) in a profiler. As another example, developers often insert diagnostic code (e.g., trace statements) into the application's code.

While conventional diagnostic tools (e.g., debuggers, profilers, etc.) have operated on "live" forward-executing code, an emerging form of diagnostic tools enable "historic" debugging (also referred to as "time travel" or "reverse" debugging), in which the execution of at least a portion of an execution context is recorded into one or more trace files (i.e., an execution trace). Using some tracing techniques, an execution trace contains "bit-accurate" historic execution trace data, which enables any recorded portion the traced execution context to be virtually "replayed" (e.g., via emulation) down to the granularity of individual instructions (e.g., machine code instructions, intermediate language code instructions, etc.). Thus, using bit-accurate trace data, diagnostic tools enable developers to reason about a recorded prior execution of a subject execution context, as opposed to conventional debugging which is limited to a "live" forward execution. For example, using replayable execution traces, some historic debuggers provide user experiences that enable both forward and reverse breakpoints/watchpoints, that enable code to be stepped through both forwards and backwards, etc. Some historic profilers, on the other hand, are able to derive code execution behaviors (e.g., timing, coverage) from prior-executed code.

Since modern processors commonly execute at the rate of tens- to hundreds-of thousands of MIPS (millions of instructions per second), replayable execution traces of executing code can generate vast amounts of information, even if mere fractions of a second are captured. As such, analyzing and presenting information about execution traces can consume considerable computing resources (e.g., processor and memory resources).

BRIEF SUMMARY

At least some embodiments described herein are directed to automated root cause identification using data flow analysis of plural execution traces. In particular, embodiments use a data flow analysis of plural execution traces of execution of an entity (e.g., a thread or a process that previously executed at a computer processor) to identify which input (or inputs) into the entity caused it to produce different execution results (i.e., a divergence of outputs from the entity) between those execution traces. These embodiments operate by analyzing plural execution traces to identify the inputs to, and outputs from, different prior executions of an entity (e.g., based on interactions by a process with system calls and/or shared memory). For each of those prior executions, these embodiments generate a corresponding data flow dependency graph (i.e., a data flow from inputs to outputs, through one or more transforming activities), and a topological sorting of each data flow dependency graph. These embodiments then pair outputs across the data flow dependency graphs (e.g., based on common system call, label, and topological order), and identify output pairings that have mismatches (i.e., different output values). These embodiments then traverse the data flow dependency graphs in topological order, starting at a mismatched output, in order to identify a set of input parings that also have data mismatches, that are ancestors of the mismatched output, and that themselves do not have mismatched ancestors that are causal to the input mismatch. In embodiments, this set of ancestor input pairings is returned as a root cause of the mismatched output and, thus, a root cause of at least one divergence between the execution traces.

By using data flow dependency graph generation, topological sorting, and input/output pairing, the embodiments herein reduce an amount of data that a computer processor analyzes/processes when determining which input(s) are causal to output(s) that differed between execution traces. In particular, the embodiments herein enable this analysis to only traverse the branches of data flow dependency graphs that are relevant to those outputs. Thus, the embodiments herein achieve a technical effect of efficiently identifying a root cause of at least one difference in the execution result of an entity in a manner that efficiently devotes computing resources (e.g., processor time, memory resources) to only a fraction of execution trace that is actually relevant to those differences. Additionally, by automatically identifying the root cause (i.e., inputs) that led to output(s) differing between execution traces, the embodiments herein efficiently pinpoint software faults, such as code bugs or invalid inputs. Further, the embodiments herein are more precise in pointing input differences that are causing the output differences (i.e., behavioral changes) than conventional analysis techniques.

In accordance with the foregoing, some embodiments are directed to methods, systems, and computer program products for automated root cause identification using data flow analysis of plural execution traces. In one implementation, based on accessing a first execution trace that records execution of an entity, a computer system generates a first data flow dependency graph that at least represents a first data flow from a first set of one or more entity inputs to a first set of one or more entity outputs through a first set of one or more activities. Each entity input in the first set of entity inputs and each entity output in the first set of entity outputs has a corresponding value and a corresponding label. The computer system also generates a first topological sorting for the first data flow dependency graph. Based on accessing a second execution trace that records execution of the entity, a computer system also generates a second data flow dependency graph that at least represents a second data flow from a second set of one or more entity inputs to a second set of one or more entity outputs through a second set of one or more activities. Each entity input in the second set of entity inputs and each entity output in the second set of entity outputs has a corresponding value and a corresponding label. The computer system also generates a second topological sorting for the second data flow dependency graph.

After generating the data flow dependency graphs and the topological sortings, the computer system also identifies a set of one or more entity output pairings. Each entity output pairing in the set comprises (i) a corresponding first entity output from the first set of entity outputs, and (ii) a corresponding second entity output from the second set of entity outputs. The corresponding first entity output and the corresponding second entity output in each entity output pairing have a common label and a common topological correspondence. The computer system also identifies a set of one or more mismatched entity output pairings from the set of entity output pairings. Each mismatched entity output pairing in the set is mismatched due at least to a corresponding first value of its corresponding first entity output differing from a corresponding second value of its corresponding second entity output. For at least one mismatched entity output pairing, the computer system traverses each of the first data flow dependency graph and the second data flow dependency graph toward a root of each data flow dependency graph, in order to identify a set of one or more entity input pairings as a topological root to the least one mismatched entity output pairing that is causal to the mismatch of the least one mismatched entity output pairing. Each entity input pairing in the set comprises (i) a corresponding first entity input from the first set of entity inputs, and (ii) a corresponding second entity inputs from the second set of entity inputs. The corresponding first entity inputs and the corresponding second entity inputs in each entity inputs pairing have (i) a common label, a (ii) common topological correspondence, and mismatched values. The computer system also returns the set of entity input pairings as a root cause for at least one difference between first execution trace and the second execution trace.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1A:
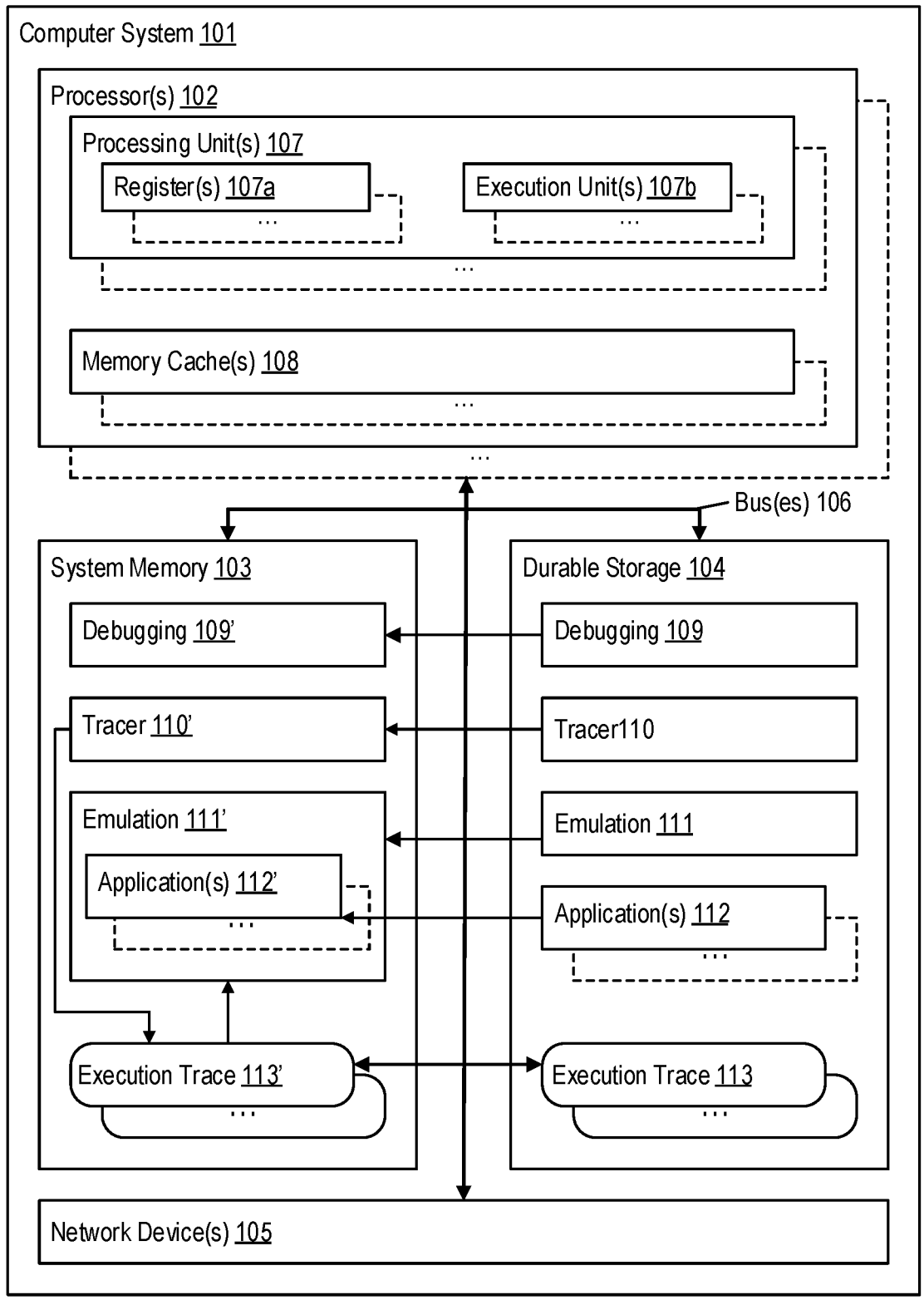
FIG. 1A illustrates an example computing environment that facilitates automated root cause identification using data flow analysis of plural execution traces.

As mentioned, at least some embodiments described herein are directed to automated root cause identification using data flow analysis of plural execution traces. In embodiments, an execution trace used by the embodiments herein is generated by one or more of a variety of historic debugging technologies. In general, historic debugging technologies record or reconstruct the state of an execution context (e.g., process, thread, etc.) at various times as code of a corresponding executable entity executes, in order to enable that execution context to be at least partially replayed from that execution state. The fidelity of that virtual execution varies depending on what traced execution state is available.

In one example, some classes of historic debugging technologies, referred to herein as time-travel debugging, continuously record a bit-accurate trace of an execution context. This bit-accurate trace can then be used later to faithfully replay that execution context's prior execution down to the fidelity of individual code instructions. For example, a bit-accurate trace records information sufficient to reproduce initial processor state for at least one point in an execution context's prior execution (e.g., by recording a snapshot of processor registers), along with the data values that were read by the executable instructions as they executed after that point in time (e.g., the memory reads). This bit-accurate trace can then be used to replay execution of those executable instructions (starting with the initial processor state) based on supplying the instructions with the recorded reads.

Another class of historic debugging technology, referred to herein as branch trace debugging, relies on reconstructing at least part of an execution context's state based on working backwards from a dump or snapshot (e.g., a crash dump) that includes a processor branch trace (i.e., which includes a record of whether or not branches were taken). These technologies start with values (e.g., memory and register) from this dump or snapshot and, using the branch trace to at least partially determine code execution flow, iteratively replay the code instructions that executed as part of the execution context, backwards and forwards, in order to reconstruct intermediary data values (e.g., register and memory) used by the code instructions until those values reach a steady state. These techniques may be limited in how far back they can reconstruct data values, and how many data values can be reconstructed. Nonetheless, the reconstructed historical execution data can be used for historic debugging.

Yet another class of historic debugging technology, referred to herein as replay and snapshot debugging, periodically records full snapshots of an execution context's memory space and processor registers while it executes. If the execution context relies on data from sources other than the execution context's own memory, or from a non-deterministic source, in embodiments these technologies also record such data along with the snapshots. These technologies then use the data in the snapshots to replay the execution of an executable entity's code between snapshots.

FIG. 1A illustrates an example computing environment 100 that facilitates automated root cause identification using data flow analysis of plural execution traces. As illustrated, computing environment 100 includes a computer system 101 (e.g., a special-purpose or general-purpose computing device), which includes a processor 102 (or a plurality of processors). As shown, in addition to processor 102, computer system 101 also includes system memory 103, durable storage 104, and potentially a network device 105 (or a plurality of network devices), which are communicatively coupled to each other, and to the processor 102, using at least one communications bus 106.

Embodiments within the scope of the present invention can include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media (e.g., system memory 103 and/or durable storage 104) that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network (e.g., network device 105) or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (not shown), and then eventually transferred to computer system RAM (e.g., system memory 103) and/or to less volatile computer storage media (e.g., durable storage 104) at the computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, machine code instructions (e.g., binaries), intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

As shown in FIG. 1A, in embodiments the processor 102 includes, for example, a processing unit 107 (or a plurality of processing units) and a memory cache 108 (or a plurality of memory caches). Each processing unit 107 (e.g., processor core) loads and executes machine code instructions on at least one of a plurality of execution units 107b. During execution of these machine code instructions, the instructions can use registers 107a as temporary storage locations, and can read and write to various locations in system memory 103 via the memory cache 108. Each processing unit 107 executes machine code instructions that are defined by a processor instruction set architecture (ISA). The particular ISA of each processor 102 can vary based on processor manufacturer and processor model. Common ISAs include the IA-64 and IA-32 architectures from INTEL, INC., the AMD64 architecture from ADVANCED MICRO DEVICES, INC., and various Advanced RISC Machine ("ARM") architectures from ARM HOLDINGS, PLC, although a great number of other ISAs exist and can be used by the present invention. In general, a machine code instruction is the smallest externally-visible (i.e., external to the processor) unit of code that is executable by a processor.

Registers 107a are hardware storage locations that are defined based on the ISA of the processor 102. In general, registers 107a are read from and/or written to by machine code instructions, or a processing unit 107, as those instructions execute at execution units 107b. Registers 107a are commonly used to store values fetched from the memory cache 108 for use as inputs to executing machine code instructions, to store the results of executing machine code instructions, to store a program instruction count, to support maintenance of a thread stack, etc. In some embodiments, registers 107a include "flags" that are used to signal some state change caused by executing machine code instructions (e.g., to indicate if an arithmetic operation cased a carry, a zero result, etc.). In some embodiments, registers 107a include one or more control registers (e.g., which are used to control different aspects of processor operation), and/or other processor model-specific registers (MSRs).

The memory cache 108 temporarily caches blocks of system memory 103 during execution of machine code instructions by processing unit 107. In some implementations, the memory cache 108 includes one or more "code" portions that cache portions of system memory 103 storing application code, as well as one or more "data" portions that cache portions of system memory 103 storing application runtime data. If a processing unit 107 requests data (e.g., code or application runtime data) not already stored in the memory cache 108, then the processing unit 107 initiates a "cache miss," causing one or more blocks of data to be fetched from system memory 103 and influxed into the memory cache 108—while potentially replacing and "evicting" some other data already stored in the memory cache 108 back to system memory 103.

As illustrated, the durable storage 104 stores computer-executable instructions and/or data structures representing executable software components; correspondingly, during execution of this software at processor 102, one or more portions of these computer-executable instructions and/or data structures are loaded into system memory 103. For example, the durable storage 104 is shown as potentially storing computer-executable instructions and/or data structures corresponding to a debugging component 109, a tracer component 110, an emulation component 111, and an application 112 (or a plurality of applications). The durable storage 104 can also store data, such as replayable execution traces 113 (which are, for example generated by the tracer component 110 using one or more of the historic debugging technologies described above).

In embodiments, the debugging component 109 leverages the emulation component 111 in order to emulate execution of code of executable entities, such as application 112, based on execution state data obtained from one of replayable execution traces 113. Thus, FIG. 1A shows that the debugging component 109 and the emulation component 111 are loaded into system memory 103 (i.e., debugging component 109' and emulation component 111'), and that execution of an application 112 is being emulated within the emulation component 111' (i.e., application 112'). As will be explained in more detail in connection with FIG. 1B, the debugging component 109 provides functionality for using data flow analysis of plural execution traces for automated root cause identification. In embodiments, the debugging component 109 is a tool (e.g., a debugger, a profiler, a cloud service, etc.) that consumes one or more of replayable execution traces 113 as part of analyzing a prior execution of an application 112.

In general, the tracer component 110 records or "traces" execution of an application 112 into one or more of replayable execution traces 113. In some embodiments, the tracer component 110 records execution of an application 112 when that execution is a "live" execution on processor 102 directly, when that execution is a "live" execution on processor 102 via a managed runtime, and/or when that execution is an emulated execution via the emulation component 111. Thus, FIG. 1A also shows that the tracer component 110 is also loaded into system memory 103 (i.e., tracer component 110'). An arrow between tracer component 110' and replayable execution traces 113' indicates that the tracer component 110' records trace data into one or more of replayable execution traces 113', which may then be persisted to the durable storage 104 as one or more of replayable execution traces 113.

Figure 2:
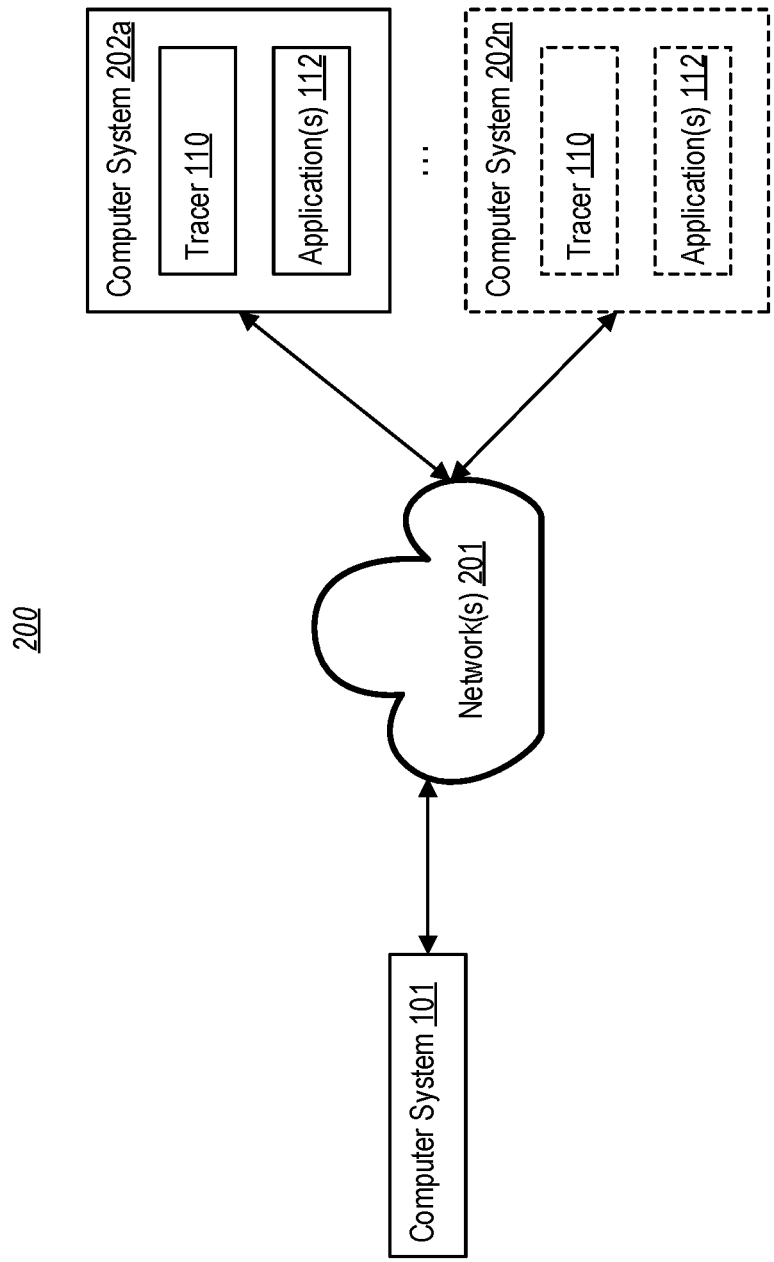
FIG. 2 illustrates an example computing environment in which the computer system of FIG. 1A is connected to one or more other computer systems over one or more networks.

In some embodiments, computer system 101 additionally, or alternatively, receives a one or more of replayable execution traces 113 from another computer system (e.g., using network device 105). For example, FIG. 2 illustrates an example computing environment 200, showing computer system 101 of FIG. 1A as being connected to a remote computer system 202 (or a plurality of remote computer systems; i.e., remote computer system 202a to remote computer system 202n) over a network 201 (or a plurality of networks). As shown in example computing environment 200, each remote computer system 202 includes a tracer component 110 and an application 112. As such, computer system 101 may receive, over network 201, one or more replayable execution traces of at least one prior execution of an application 112 at a remote computer system 202.

It is noted that while, in some embodiments, the debugging component 109, the tracer component 110, and/or the emulation component 111 are each independent components or applications, in other embodiments they are alternatively integrated into the same application (such as a debugging suite), or are integrated into another software component— such as an operating system component, a hypervisor, a cloud fabric, etc. As such, those skilled in the art will also appreciate that the invention may be practiced in a cloud computing environment that includes computer system 101. For instance, while in some embodiments these components take the form of one or more software applications executed at a user's local computer, in other embodiments they take the form of a service provided by a cloud computing environment.

It was mentioned previously that the debugging component 109 provides functionality for using data flow analysis of plural execution traces for automated root cause identification. In particular, embodiments of the debugging component 109 use a data flow analysis of at least two execution traces (e.g., each being one of replayable execution traces 113) of execution of an entity (e.g., application 112) to identify which input (or inputs) into the entity caused the entity to produce different results between those execution traces. In embodiments, the debugging component 109 identifies, from first and second execution traces, the inputs to, and outputs from, first and second executions of an entity. For each of those prior executions, embodiments of the debugging component 109 generate a corresponding data flow dependency graph (i.e., a data flow from inputs to outputs, through one or more transforming activities), and a topological sorting of each data flow dependency graph. Embodiments of the debugging component 109 then pairs outputs across the data flow dependency graphs, and identifies output pairings that have mismatches (i.e., different output values). Embodiments of the debugging component 109 then traverses the data flow dependency graphs in topological order, starting at a mismatched output, in order to identify a set of input parings that also have data mismatches, that are ancestors of the mismatched output, and that themselves do not have mismatched ancestors that are causal to the input mismatch. Embodiments of the debugging component 109 then return this set of ancestor input pairings as a root cause of the mismatched output and, thus, a root cause of at least one divergence between the execution traces.

Figure 1B:
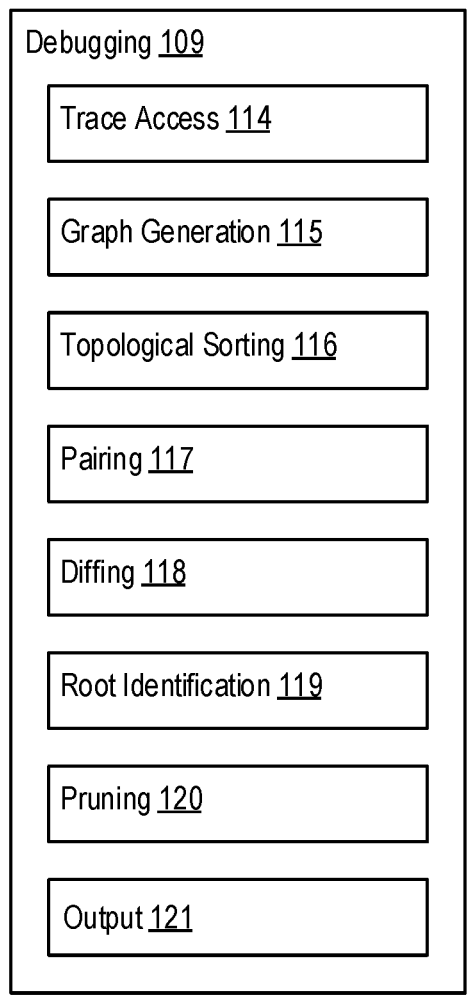
FIG. 1B illustrates an example debugging component that uses data flow analysis of plural execution traces for automated root cause identification.

To demonstrate how embodiments of the debugging component 109 accomplish the foregoing, FIG. 1B illustrates additional detail of the debugging component 109, including components (e.g., trace access component 114, graph generation component 115, topological sorting component 116, pairing component 117, diffing component 118, root identification component 119, pruning component 120, output component 121, etc.) that operate to use data flow analysis of plural execution traces for automated root cause identification. The depicted components of the debugging component 109, together with any sub-components, represent various functions that the debugging component 109 might implement or utilize in accordance with various embodiments described herein. It will be appreciated, however, that the depicted components—including their identity, sub-components, and arrangement—are presented merely as an aid in describing various embodiments of the debugging component 109 described herein, and that these components are non-limiting to how software and/or hardware might implement various embodiments of the debugging component 109 described herein, or of the particular functionality thereof.

Figure 3:
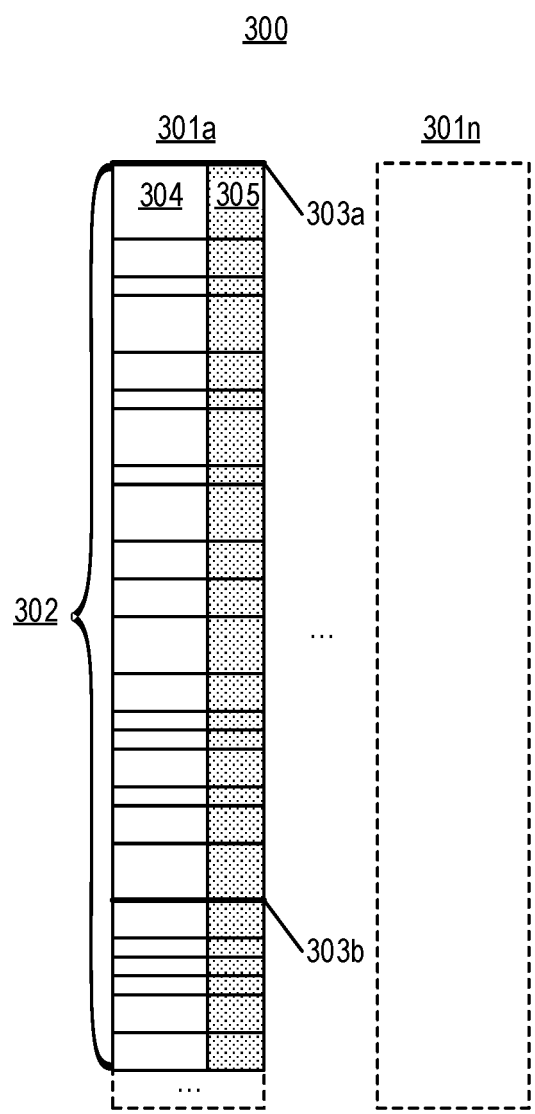
FIG. 3 illustrates an example of an execution trace.

In general, the trace access component 114 accesses plural execution traces of an entity, such as first and second execution traces (i.e., each being one of replayable execution traces 113) of prior executions of application 112, from the durable storage 104, from a remote computer system 202, etc. FIG. 3 illustrates an example of an execution trace. In particular, FIG. 3 illustrates an execution trace 300 that includes a plurality of data streams 301 (i.e., data streams 301a-301n). In embodiments, each of data streams 301 represents execution of a different execution context, such as a different thread that executed from application 112. In an example, data stream 301a records execution of a first thread of application 112, while data stream 301n records an $n^{th}$ thread of application 112. As shown, data stream 301a comprises a plurality of data packets 302. Since the particular data logged in each of data packets 302 can vary, these data packets are shown as having varying sizes. In embodiments, when using time-travel debugging technologies, one or more of data packets 302 records the inputs (e.g., register values, memory values, etc.) to one or more executable instructions that executed as part of this first thread of application 112. In embodiments, memory values are obtained as influxes to memory cache 108 and/or as uncached reads. In embodiments, data stream 301a also includes one or more key frames 303 (e.g., key frames 303a and 303b), each capturing sufficient information (e.g., such as a snapshot of register and/or memory values) to enable the prior execution of the thread to be replayed—starting at the point of the key frame and proceeding forward.

In embodiments, an execution trace also includes the actual code that was executed. Thus, in FIG. 3, each of data packets 302 is shown as including a data inputs portion 304

(non-shaded) and a code portion 305 (shaded). In embodiments, the code portion 305 of each of data packets 302, if present, includes the executable instructions that executed based on the corresponding data inputs. In other embodiments, however, an execution trace omits the actual code that was executed, instead relying on having separate access to the executable code (e.g., a copy of application 112). In these other embodiments, each data packet specifies an address or offset to an appropriate executable instruction in an application binary image. Although not shown, it is possible that the execution trace 300 includes a data stream that stores one or more of the outputs of code execution. It is noted that used of different data input and code portions of a data packet is for illustrative purposes only, and that the same data could be stored in a variety of manners, such as by the use of multiple data packets.

If there are multiple data streams, in embodiments these data streams include sequencing events. Each sequencing event records the occurrence of an event that is orderable across different execution contexts, such as threads. In one example, sequencing events correspond to interactions between the threads, such as accesses to memory that is shared by the threads. Thus, for instance, if a first thread that is traced into a first data stream (e.g., data stream 301*a*) writes to a synchronization variable, a first sequencing event is recorded into that data stream (e.g., data stream 301*a*). Later, if a second thread that is traced into a second data stream (e.g., data stream 301*b*) reads from that synchronization variable, a second sequencing event is recorded into that data stream (e.g., data stream 301*b*). These sequencing events are inherently ordered. For example, in some embodiments each sequencing event is associated with a monotonically incrementing value, with the monotonically incrementing values defining a total order among the sequencing events. In one example, a first sequencing event recorded into a first data stream is given a value of one, a second sequencing event recorded into a second data stream is given a value of two, etc.

In general, the graph generation component 115 operates to generate a data flow dependency graph for each execution trace accessed by the trace access component 114. Initially, the graph generation component 115 identifies a set of an entity's inputs and a set of the entity's outputs that were captured by each execution trace of the entity. In embodiments, identifying the inputs and outputs captured by each execution trace comprises determining which external data (i.e., inputs) makes it into the entity's execution context (e.g., thread, process, etc.), as captured by the execution trace; and which generated data (i.e., outputs) makes it outside the entity's execution context, as captured by the execution trace. In embodiments, an entity's inputs comprise any data that comes from the outside of the entity's execution context—for example, data received from a file, data obtained over a network, data provided by a user, value(s) of a configuration file, a value of a registry key, etc. In various examples, an entity's inputs can come from (i) data produced by a system (i.e., kernel) call made by the entity, including anything the system call brings back to the entity's execution context—such as modified buffers, addresses changes, etc.; (ii) data read from a shared memory location by the entity; (iii) data placed by an operating system into the entity's execution context (e.g., a memory location within a corresponding address space, a register, etc.), such as command line argument(s), environment variables, etc.); (iv) reads by the entity from memory-mapped input/output (I/O); and (v) code and data (e.g., constants, global variables, etc.) in the entity's binary. In embodiments, an entity's outputs comprise data provided by the entity to system calls, and/or data written to shared memory by the entity.

In embodiments, for each input or output, the graph generation component 115 identifies a corresponding value, a corresponding label, and a corresponding address (e.g., memory location or register location). In embodiments, a label identifies a given input or output. In one example, a label for an input comprises a file name, a file offset, a registry key, an object name, etc. In another example, a label for an output comprises a name of a system call, potentially with one or more parameters to the system call.

In embodiments, the graph generation component 115 identifies data consumed by system calls (e.g., a calling entity's outputs) and data produced by system calls (e.g., a calling entity's inputs) using application programming interface (API) annotations for those system calls. In embodiments, API annotations contain enough information to identify what is an input of a system call (e.g., system call parameters) and what is an output of the system call (e.g., system call return values), as well as the appropriate data types. Further, by looking at data type structure, in embodiments the graph generation component 115 uses static analysis to identify if those data types contain further pointers to follow. When this static information is combined with dynamic information obtained from a trace recording, the graph generation component 115 identifies the inputs into and the outputs from a system call and, in turn, identifies what portion of a system call's output became an entity input.

In some embodiments, the graph generation component 115 identifies shared memory by tracking the system calls that create shared memory, and in turn identifies which region(s) of memory to monitor for identifying entity inputs (i.e., reads by the entity from those region(s)) and entity outputs (i.e., writes by the entity to those regions(s)). In other embodiments, the graph generation component 115 identifies shared memory by monitoring any region of memory where value(s) in an execution recording change on a read; if none of the recorded entity's code can produce that value before the read, then it was an external entity (e.g., hardware, software, or an unrecorded portion of the entity) that changed the value.

After identifying the inputs and outputs for each execution trace, the graph generation component 115 uses those inputs and outputs to generate a corresponding data flow dependency graph for each execution trace. In embodiments, each data flow dependency graph is a directed acyclic graph (DAG) that links inputs to outputs through transforming activities. In some embodiments, the graph generation component 115 generates bipartite DAGs in which a first vertex type represents an input or an output, a second vertex type represents an activity, and each edge connects a vertex of the first type and a vertex of the second type. In these bipartite DAGs, when an edge is directed from a first vertex of the first type to a second vertex of the second type, the first vertex represents an input to an activity represented by the second vertex; alternatively, when an edge is directed from a first vertex of the second type to a second vertex of the first type, the second vertex represents an output from an activity represented by the first vertex. In other embodiments, the graph generation component 115 generates DAGs in which each edge is directed from a first vertex representing a first activity to a second vertex representing a second activity, and each edge represents an output from the first activity and an input to the second activity.

While a data flow dependency graph can represent these transformations at various granularities (e.g., with a transforming activity being an instruction, a function, a module, a context switch, etc.), conceptually, building each data flow dependency graph comprises stitching data flow graphs from individual code instructions; since every input and output of the code instructions are inherently addressed either by a register name or a memory address, identifying which outputs of a given instruction are the inputs of a following instruction involves comparing the addresses. In some embodiments, the graph generation component 115 generates data flow dependency graphs at context switches, with system calls being the transforming activities, entity inputs being outputs of system calls (i.e., a context switch from a system call to the entity's execution context), and entity outputs being inputs to system calls (i.e., a context switch from the entity's execution context to a system call).

In general, the topological sorting component 116 operates to generate a topological sorting of each data flow dependency graph generated by the graph generation component 115. In embodiments, generating a topological sorting of each data flow dependency graph facilitates a pairing of vertices among data flow dependency graphs, based at least on a topological correspondence between those vertices (i.e., an identical, or similar, sorted position of those vertices in two different topological sorting orders that are generated from two different data flow dependency graphs). As will be appreciated by one of ordinary skill in the art, a topological sort of a DAG is a linear ordering of its vertices such that, for every directed edge uv from vertex u to vertex v, u comes before v in the ordering. In embodiments, the topological sorting component 116 generates a topological sorting based on ordering outputs.

Figure 4:
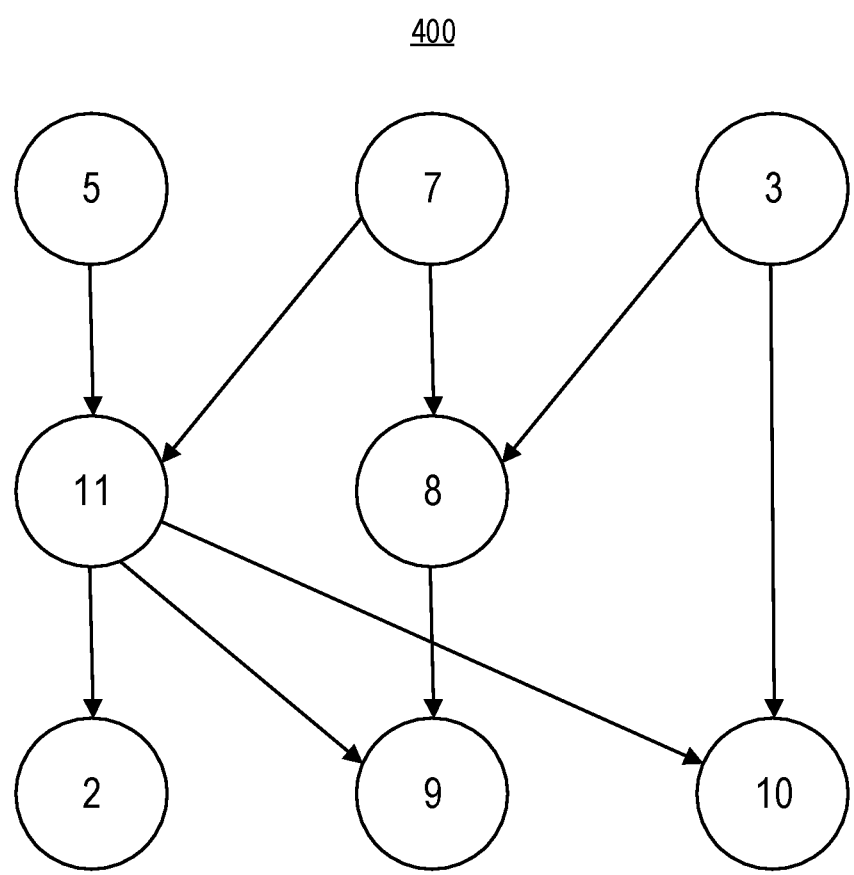
FIG. 4 illustrates an example of a directed graph.

To demonstrate topological sorting, FIG. 4 illustrates an example of a directed graph 400. In particular, the directed graph 400 comprises a plurality of vertices with directed edges connecting those vertices. Within directed graph 400, several topological sorting orders are possible. For example:
  5, 7, 3, 11, 8, 2, 9, 10 (visual top-to-bottom, left-to-right)
  3, 5, 7, 8, 11, 2, 9, 10 (smallest-numbered available vertex first)
  5, 7, 3, 8, 11, 10, 9, 2 (fewest outbound edges first)
  7, 5, 11, 3, 10, 8, 9, 2 (largest-numbered available vertex first)
  5, 7, 11, 2, 3, 8, 9, 10 (attempting top-to-bottom, left-to-right)
  3, 7, 8, 5, 11, 10, 2, 9 (arbitrary)

In general, the pairing component 117 operates to locate pairs of inputs and pairs of outputs in the data flow dependency graphs, with one input from each input pair originating from each of the two data flow dependency graphs generated by the graph generation component 115, and with one output from each output pair originating from each of the two data flow dependency graphs generated by the graph generation component 115. In embodiments, the pairing component 117 pairs inputs/outputs that are associated with the same system (or similar) call, that have the same (or similar) labels, and that have topological correspondence with each other (based on the topological sortings generated by the topological sorting component 116).

In general, the diffing component 118 operates to utilize the pairings generated by the pairing component 117 in order to find mismatching pairs across the two data flow dependency graphs. Thus, in some embodiments, the diffing component 118 compares one or more output pairs identified by the pairing component 117 to determine whether or not their corresponding values match, in order to generate a set of mismatched output pairings. In other embodiments, the diffing component 118 compares one or more input pairs identified by the pairing component 117 to determine whether or not their corresponding values match, in order to generate a set of mismatched input pairings.

In general, the root identification component 119 operates to traverse the data flow dependency graphs—starting at one or more mismatching output pair(s)—in order to find one or more mismatching input pair(s) that (i) are ancestors of those mismatching output pair(s), and that (ii) themselves do not have ancestors that explain the difference in their mismatched input. In embodiments, when traversing back from a difference, the root identification component 119 stops the search at any vertex that has the same input values and labels in both graphs. In some embodiments, the root identification component 119 identifies a minimal set of ancestor mismatching input pairs that explains (i.e., is causal to) the mismatched output pair(s). In embodiments, this minimal set of ancestor mismatching input pairs is considered a root cause of the mismatched output pair(s)—and thus a root cause of at least one difference between the execution traces.

In general, the pruning component 120 operates in conjunction with any of the graph generation component 115, topological sorting component 116, pairing component 117, diffing component 118, root identification component 119 in order to simplify one (or both) of the data flow dependency graphs, thereby reducing a search space and improving efficiency of the debugging component 109 (e.g., in terms of memory usage, processor usage, etc.). Thus, in embodiments, the pruning component 120 enables the debugging component 109 to focus on parts of data flow dependency graphs that contribute to output differences, enabling the debugging component 109 to ignore portion(s) of data flow dependency graphs that do not reach an output difference. In one example, when the pruning component 120 removes an input or output from a data flow dependency graph, it also removes a corresponding paring (if it exists). In another example, after, or in conjunction with, operation of the diffing component 118 to identify mismatched output pairings, the pruning component 120 removes inputs that lack any data flow path to a mismatched output. In another example, after, or in conjunction with, operation of diffing component 118 to identify mismatched output pairings, the pruning component 120, the pruning component 120 removes outputs that match. In another example, after, or in conjunction with, operation of the diffing component 118 to identify mismatched output pairings, the pruning component 120 removes downstream mismatching outputs that cascade from an ancestor mismatching output.

In general, the output component 121 operates to provide an output of the mismatching input pair(s) identified by the root identification component 119 as a root cause for at least one difference between the subject execution traces. In addition, in some embodiments the output component 121 also provides an output of a system call chain from a root input to a mismatched output, an indication of the values of the inputs in a root input pair, an indication of the labels of the inputs in a root input pair, an indication of the addresses of the inputs in a root input pair, and the like. In some embodiments, the output component 121 outputs to a user interface, while in other embodiments the output component 121 outputs to another software component (which then operates on that output), or to another computer system (which then operates on that output).

In order to provide an example of at least a portion of operation of operation the debugging component 109, attention is now directed to FIG. 5A to FIG. 5G, which provide an example of performing an automated root cause identification using data flow analysis of execution traces of an entity that that reads data from a data structure and prints the last value that was read. In the example, the data structure is an on-disk file comprising a set of two-byte records, with the first byte specifying an offset for a next record, and the second byte comprising the value of that record. In the example, the entity ignores the statuses of system calls—and thus those statuses are not considered to be inputs to the entity.

Figure 5A:
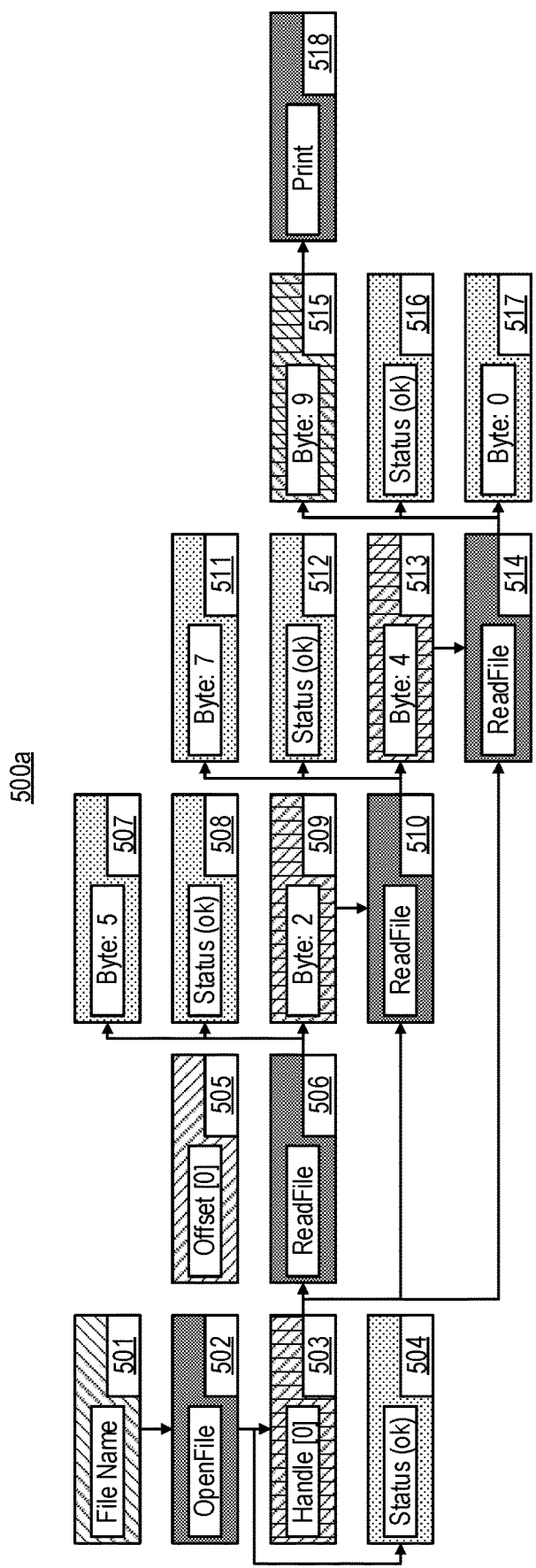
FIG. 5A illustrates an example of a first data flow dependency graph generated from a first execution trace of a first run an entity.

Turning to FIG. 5A, illustrated is an example 500a of a first data flow dependency graph (in the form of a bipartite DAG) generated by the graph generation component 115 from a first execution trace of a first run of the entity just described. In example 500a, the first run of the entity has read a data structure comprising the following: at byte 0, a record comprising offset 2 and value 5; at byte 2, a record comprising offset 4 and value 7; and at byte 4, a record comprising offset 0 and value 9. This data structure is represented more concisely as: [0] 2:5; [2] 4:7; [4] 0:9. In example 500a (and continuing examples 500b-500g), vertices with dark shading (i.e., vertex 502, vertex 506, vertex 514, and vertex 518) represent system call activities; vertices with light shading (i.e., vertex 504, vertex 507, vertex 508, vertex 511, vertex 512, vertex 516, and vertex 517) represent output statuses of system calls that are ignored by the entity; and vertices with diagonal lines represent hardcoded inputs (e.g., program constants), with vertices having forward diagonal lines (i.e., vertex 501, corresponding to a file name) being used as an input, and vertices having backward diagonal lines (i.e., vertex 505, corresponding to an offset of 0) being used as a label. Finally, vertices with mixed vertical lines and diagonal lines (i.e., vertex 503, vertex 509, vertex 513, and vertex 515) represent outputs of system calls, with vertices having mixed vertical and forward diagonal lines (i.e., vertex 515) becoming an input to another system call—and an entity output; and vertices having mixed vertical and backward diagonal lines (i.e., vertex 503, vertex 509, and vertex 513) becoming a label for another system call—and an entity input. Thus, in example 500a, the entity inputs a file name (vertex 501) referring to a data structure comprising the records [0] 2:5; [2] 4:7; [4] 0:9, inputs a hardcoded offset of 0 (vertex 505), and outputs the value 9 (vertex 515).

Figure 5B:
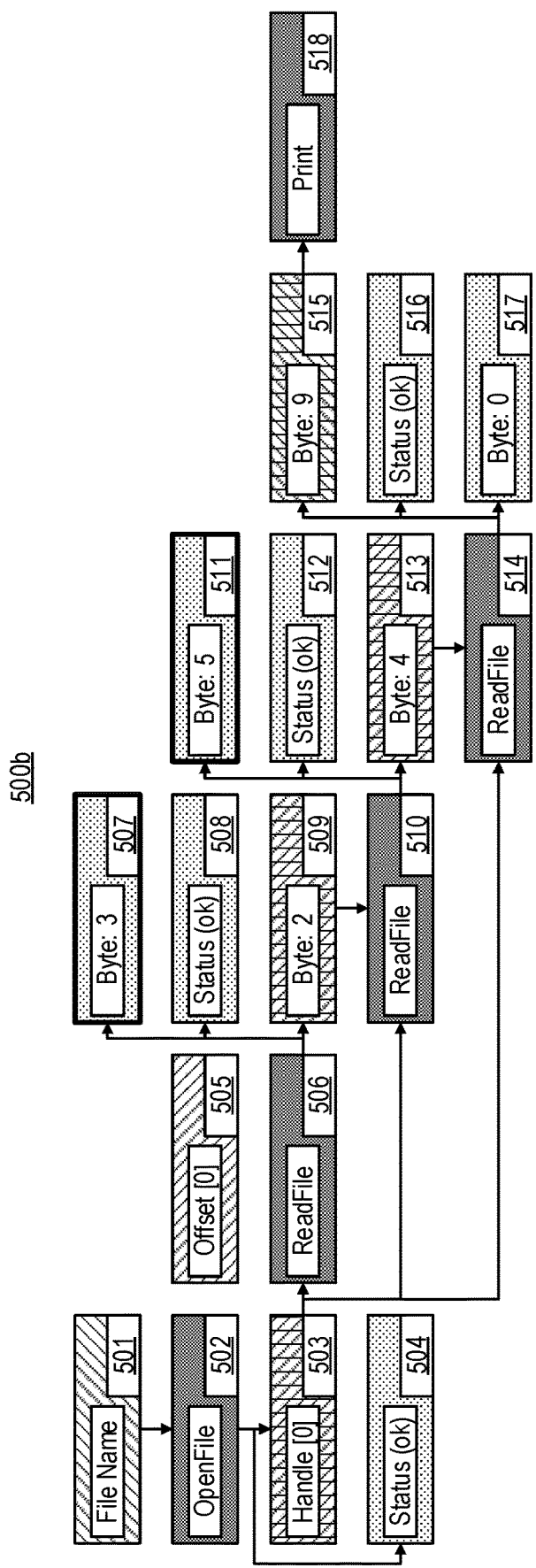
FIG. 5B illustrates an example of a second data flow dependency graph generated from a second execution trace of a second run the entity introduced in connection with FIG. 5A.

FIG. 5B illustrates an example 500b of a second data flow dependency graph generated from a second execution trace of a second run the entity introduced in connection with FIG. 5A. In example 500b, the second run of the entity has read a data structure comprising: [0]2:3; [2] 4:7; [4] 0:9. As shown by vertex 515, in example 500b the entity outputs the value 9. In example 500b, vertex 507 and vertex 511 are outlined in heavy lines, indicating that their values (i.e., 3 and 5, respectively) differ from vertex 507 and vertex 511 in example 500a (the first run the entity). Here, vertex 507 and vertex 511 correspond to system call outputs that are not consumed by the entity, and output of the second run of the entity the same as output of the first run the entity. As such, when comparing an execution trace of the first run in example 500a with an execution trace of the second run in example 500b, in some embodiments the debugging component 109 does not report any difference between the runs, as they behaved the same from an entity output point of view.

Figure 5C:
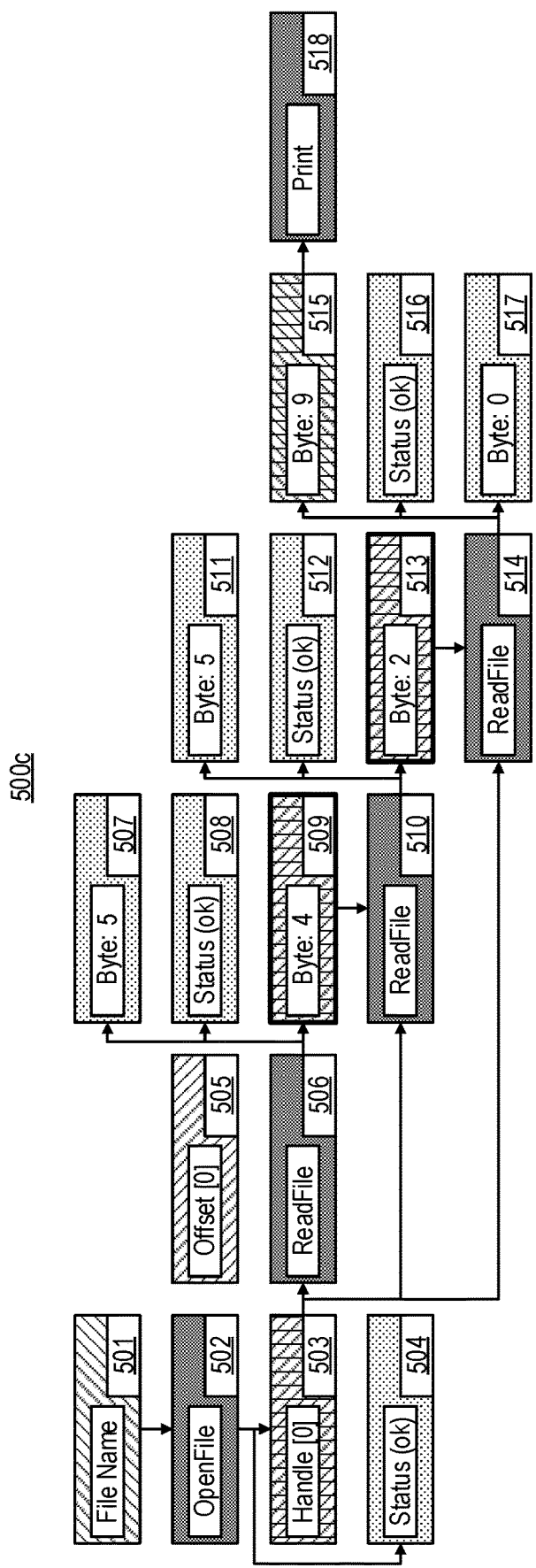
FIG. 5C illustrates an example of a third data flow dependency graph generated from a third execution trace of a third run the entity introduced in connection with FIG. 5A.

FIG. 5C illustrates an example 500c of a third data flow dependency graph generated from a third execution trace of a third run the entity introduced in connection with FIG. 5A. In example 500c, the third run of the entity has read a data structure comprising: [0] 4:5; [2] 0:9; [4] 2:3. In example 500c, vertex 509 and vertex 513 are outlined in heavy lines, indicating that their values (i.e., 4 and 2, respectively) differ from vertex 509 and vertex 513 in example 500a (the first run the entity). Here, vertex 509 and vertex 513 correspond to system call outputs that are intermediate values, and output of the third run of the entity the same as output of the first run the entity. As such, similar to example 500b, when comparing an execution trace of the first run in example 500a with an execution trace of the third run in example 500c, in some embodiments the debugging component 109 does not report any difference between the runs, as they behaved the same from an entity output point of view.

Figure 5D:
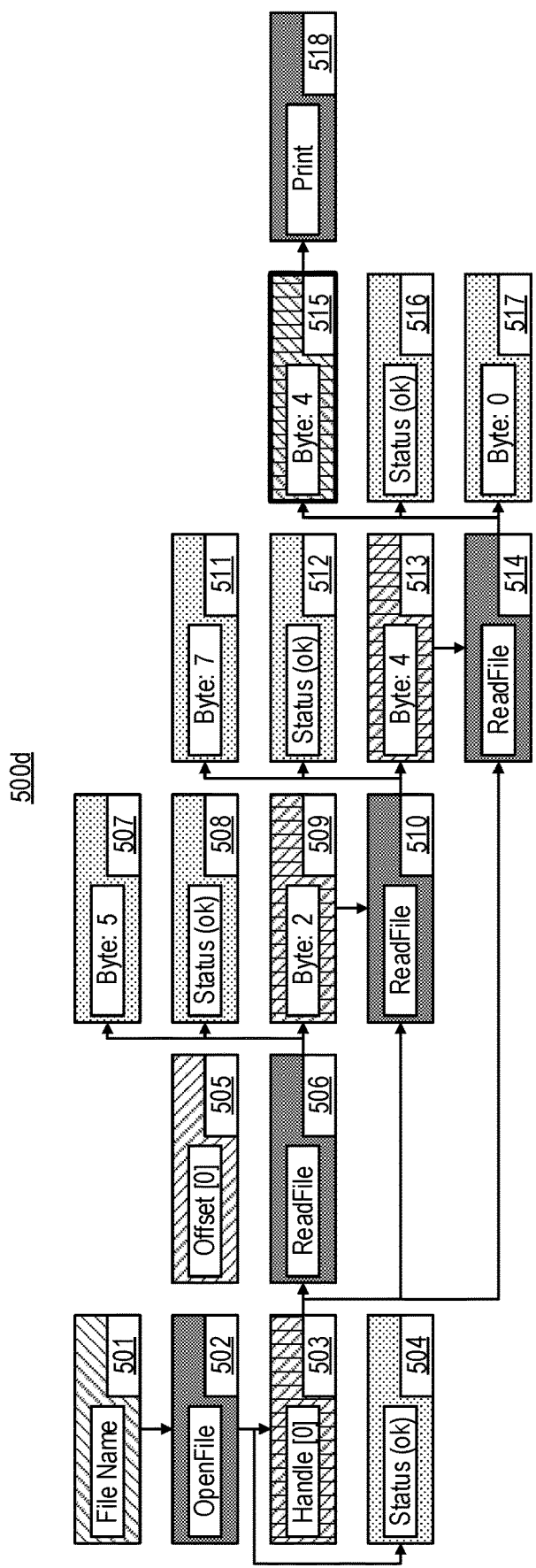
FIG. 5D illustrates an example of a fourth data flow dependency graph generated from a fourth execution trace of a fourth run the entity introduced in connection with FIG. 5A.

FIG. 5D illustrates an example 500d of a fourth data flow dependency graph generated from a fourth execution trace of a fourth run the entity introduced in connection with FIG. 5A. In example 500d, the fourth run of the entity has read a data structure comprising: [0] 2:5; [2] 4:7; [4] 0:4. As shown by vertex 515, in example 500d the entity outputs the value 4. In example 500d, vertex 515 is outlined in heavy lines, indicating that its value (i.e., 4) differs from vertex 515 in example 500a (the first run the entity). Here, vertex 515 corresponds to an entity output, and output of the fourth run of the entity is different than output of the first run the entity. As such, when comparing an execution trace of the first run in example 500a with an execution trace of the fourth run in example 500d, in some embodiments the debugging component 109 reports the difference between the runs. However, since only vertex 515 is different between the runs, in embodiments the debugging component 109 only reports this single difference.

Figure 5E:
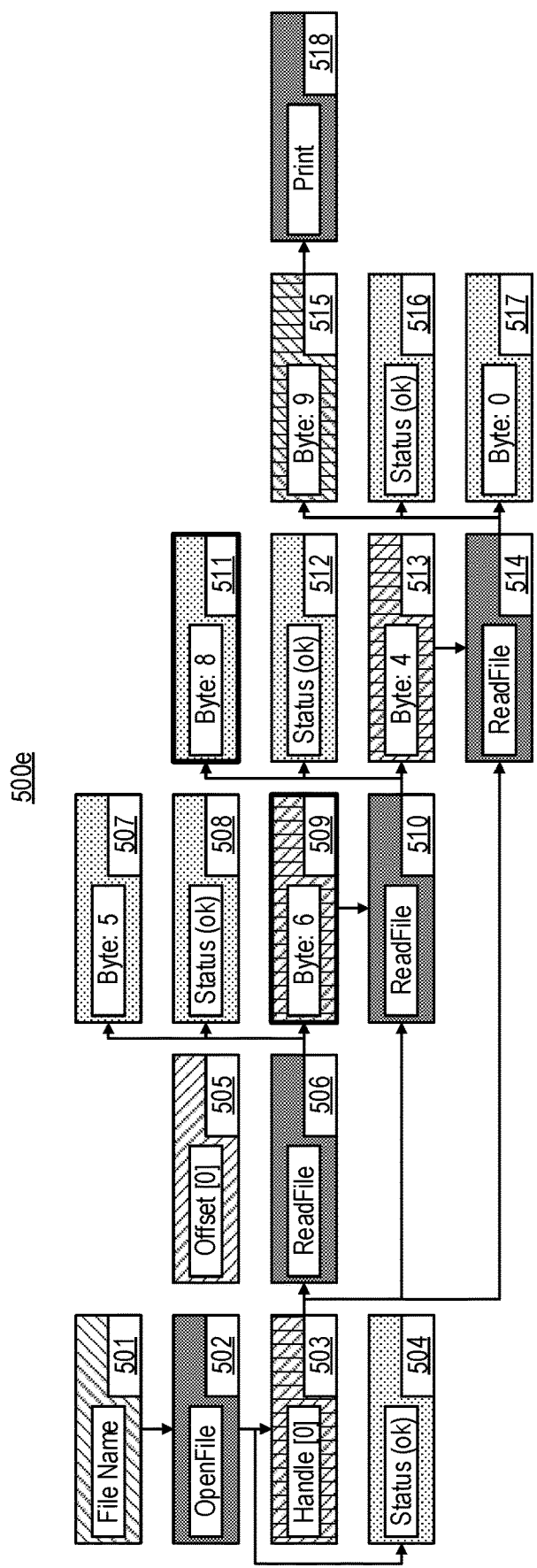
FIG. 5E illustrates an example of a fifth data flow dependency graph generated from a fifth execution trace of a fifth run the entity introduced in connection with FIG. 5A.

FIG. 5E illustrates an example 500e of a fifth data flow dependency graph generated from a fifth execution trace of a fifth run the entity introduced in connection with FIG. 5A.

In example 500e, the fifth run of the entity has read a data structure comprising: [0] 6:5; [2] 0:0; [4] 0:9; [6] 4:8. As shown by vertex 515, in example 500e the entity outputs the value 9. In example 500e, vertex 509 and vertex 511 are outlined in heavy lines, indicating that their values (i.e., 6, and 8, respectively) differ from vertex 509 and vertex 511 in example 500a (the first run the entity). Example 500e is similar to example 500d, but vertex 509 and vertex 511 are intermediate values that have changed—but are not a direct input to the last ReadFile system call (vertex 514). Since those intermediate values did not reach the ReadFile system call, they do not contribute to any change in the output (vertex 515). Thus, example 500e is similar to example 500b and example 500c, where those differences did not cause an output change. As such, when comparing an execution trace of the first run in example 500a with an execution trace of the fifth run in example 500e, in some embodiments the debugging component 109 does not report any difference between the runs, as they behaved the same from an entity output point of view.

Figure 5F:
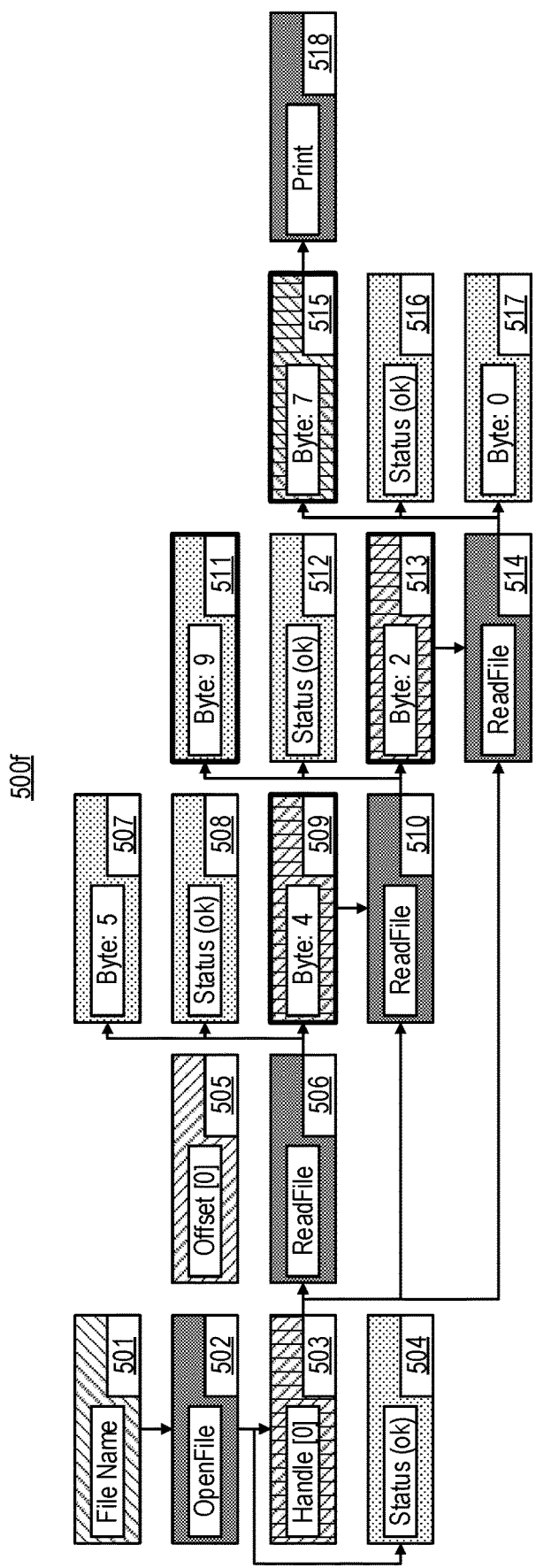
FIG. 5F illustrates an example of a sixth data flow dependency graph generated from a sixth execution trace of a sixth run the entity introduced in connection with FIG. 5A.
Figure 5G:
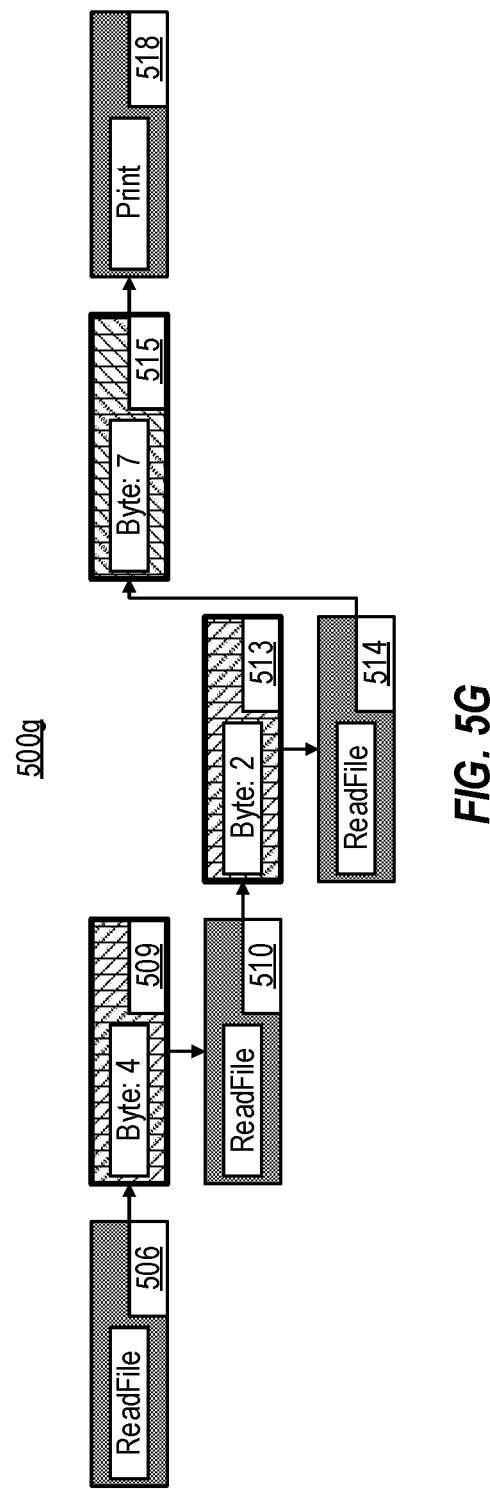
FIG. 5G illustrates an example of an output of a debugging component based on the sixth data flow dependency graph of FIG. 5F.

FIG. 5F illustrates an example 500f of a sixth data flow dependency graph generated from a sixth execution trace of a sixth run the entity introduced in connection with FIG. 5A. In example 500f, the sixth run of the entity has read a data structure comprising: [0] 4:5; [2] 0:7; [4] 2:9. As shown by vertex 515, in example 500f the entity outputs the value 7. In example 500f, vertex 509, vertex 511, and vertex 515 are outlined in heavy lines, indicating that their values (i.e., 4, 9, and 7, respectively) differ from vertex 509, vertex 511, and vertex 515 in example 500a (the first run the entity). The sixth run in example 500f not only produced a different result than the first run (vertex 515), but some of the labels (vertex 509 and vertex 513) leading to the ReadFile system call at vertex 514 are also changed. Example 500f can be seen as the entity reading the $1^{st}$, $3^{rd}$, and $2^{nd}$ record of the file (in that order) instead of the 1$^{st}$, 2$^{nd}$, and 3$^{rd}$ record of the file (in that order), due to the offsets in the record having changed. As such, when comparing an execution trace of the first run in example 500*a* with an execution trace of the sixth run in example 500*f*, in some embodiments the debugging component 109 reports the difference between the runs. In embodiments, when reporting the differences, the debugging component 109 reports the chain of changes. For example, FIG. 5G illustrates an example 500*g* of an output of the debugging component 109 based on the sixth data flow dependency graph of FIG. 5F. In example 500*g*, the debugging component 109 outputs the vertices that differed (i.e., vertex 509, vertex 513, and vertex 515), along with associated system calls (i.e., vertex 506, vertex 510, vertex 514, and vertex 518).

In order to further describe operation of these components of debugging component 109, the following discussion now refers to a method and method acts. Although the method acts may be discussed in certain orders, or may be illustrated in a flow chart as occurring in a particular order, no particular ordering is required unless specifically stated, or required because an act is dependent on another act being completed prior to the act being performed.

Figure 6:
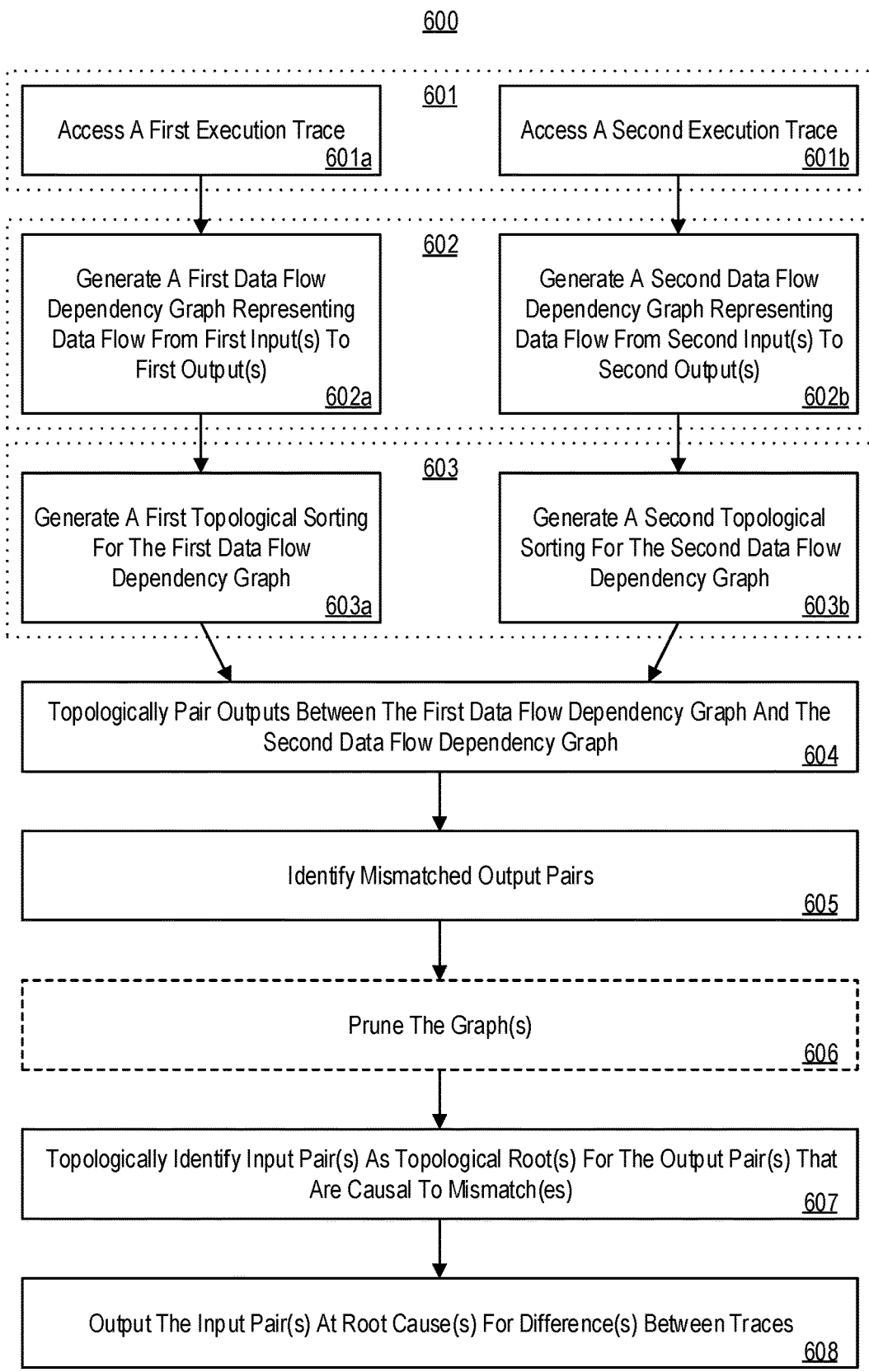
FIG. 6 illustrates a flow chart of an example method for automated root cause identification using data flow analysis of plural execution traces.

FIG. 6 illustrates a flow chart of an example method 600 for automated root cause identification using data flow analysis of plural execution traces. Method 600 will be described with respect to the components and data of computing environment 100.

Method 600 comprises an act 601 of accessing execution traces, including an act 601*a* of accessing a first execution trace, and an act 601*b* of accessing a second execution trace. In some embodiments, act 601*a* comprises accessing a first execution trace that records execution of an entity. In some embodiments, act 601*b* comprises accessing a second execution trace that records execution of the entity. In an example of act 601, the trace access component 114 access the first execution trace and the second execution trace from the replayable execution traces 113. In embodiments, act 601 has a technical effect of loading replayable execution traces from durable storage 104, or from a remote computer system 202, for analysis by at least the graph generation component 115.

Method 600 also comprises an act 602 of generating data flow dependency graphs, including an act 602*a* of generating a first data flow dependency graph representing data flow from first input(s) to first output(s), and an act 602*b* of generating a second data flow dependency graph representing data flow from second input(s) to second output(s). In some embodiments, act 602*a* comprises, based on accessing the first execution trace, generating a first data flow dependency graph that at least represents a first data flow from a first set of one or more entity inputs to a first set of one or more entity outputs through a first set of one or more activities, each entity input in the first set of entity inputs and each entity output in the first set of entity outputs having a corresponding value and a corresponding label. In some embodiments, act 602*b* comprises, based on accessing the second execution trace, generating a second data flow dependency graph that at least represents a second data flow from a second set of one or more entity inputs to a second set of one or more entity outputs through a second set of one or more activities, each entity input in the second set of entity inputs and each entity output in the second set of entity outputs having a corresponding value and a corresponding label. In an example of act 602, for each of the first and second execution traces accessed by the trace access component 114 in act 601, the graph generation component 115 identifies a set of entity inputs and a set of entity outputs from the trace, and then generates a data flow dependency graph for each trace using those identified sets of entity inputs/outputs. In embodiments, act 602 has a technical effect of transforming replayable execution traces into a data structure, such as within system memory 103, that is usable for efficiently identifying input and output differences between the replayable execution traces.

As mentioned, in some embodiments data flow dependency graphs are bipartite DAGs, in which a first vertex type represents an input or an output, a second vertex type represents an activity, and each edge connects a vertex of the first type and a vertex of the second type; thus, in some embodiments of act 602, each data flow dependency graph is a DAG in which each directed edge connects a corresponding first vertex representing either an input or an output and a corresponding second vertex representing a corresponding activity, and in which, when the directed edge is directed from the corresponding first vertex to the corresponding second vertex, the corresponding first vertex represents an input to the corresponding activity; or when the directed edge is directed from the corresponding second vertex to the corresponding first vertex, the corresponding first vertex represents an output from the corresponding activity.

As mentioned, in some embodiments data flow dependency graphs are DAGs in which each edge is directed from a first vertex representing a first activity to a second vertex representing a second activity, and each edge represents an output from the first activity and an input to the second activity; thus, in some embodiments of act 602, each data flow dependency graph is a DAG, in which each directed edge is directed from a corresponding first vertex representing a corresponding first activity to a corresponding second vertex representing a corresponding second activity, and in which the directed edge represents an output from the corresponding first activity and an input to the corresponding second activity.

Method 600 also comprises an act 603 of generating topological sortings, including an act 603*a* of generating a first topological sorting for the first data flow dependency graph, and an act 603*b* of generating a second topological sorting for the second data flow dependency graph. In some embodiments, act 603*a* comprises, based on accessing the first execution trace, generating a first topological sorting for the first data flow dependency graph. In some embodiments, act 603*b* comprises, based on accessing the second execution trace, generating a second topological sorting for the second data flow dependency graph. In an example of act 603, the topological sorting component 116 generates a corresponding topological sorting each data flow dependency graph that was generated in act 602. As mentioned, this topological sorting is based on outputs; thus, in some embodiments of act 603 the first topological sorting for the first data flow dependency graph is generated based on the first set of entity outputs, and the second topological sorting for the second data flow dependency graph is generated based on the second set of entity outputs. By generating topological sortings, the efficiency of automated root cause identification (in terms of processing power required and computation time) is improved because those topological sortings facilitate a computationally inexpensive pairing of vertices among data flow dependency graphs, based at least on a topological correspondence between those vertices.

As shown, while act 601, act 602, and act 603 are performed with respect to each of the first execution trace (i.e., act 601*a*, act 602*a*, and act 603*a*) and the second execution trace (i.e., act 601*b*, act 602*b*, and act 603*b*), the there is no strict requirement of an ordering of these acts with respect to the first execution trace as they relate to the second execution trace. Thus, in various embodiments, these acts are performed serially (i.e., on one execution trace and then the other execution trace), or are performed at least partially in parallel (e.g., on both execution traces concurrently).

Method 600 also comprises an act 604 of topologically pairing outputs between the first data flow dependency graph and the second data flow dependency graph. In some embodiments, act 604 comprises identifying a set of one or more entity output pairings, each entity output pairing in the set comprising (i) a corresponding first entity output from the first set of entity outputs, and (ii) a corresponding second entity output from the second set of entity outputs, and in which the corresponding first entity output and the corresponding second entity output in each entity output pairing have a common label and a common topological correspondence. In an example of act 604, the pairing component 117 uses the topological sortings identified by the topological sorting component 116 in act 603 to locate pairs of outputs in the first and second data flow dependency graphs (e.g., based on outputs having same (or similar) labels and having a topological correspondence) with one output from each output pair originating from each of the two data flow dependency graphs generated by the graph generation component 115 in act 602. As mentioned, the pairing component 117 can also pair outputs as further being associated with the same system call; thus, in some embodiment of act 604 the first entity outputs and the second entity outputs in each entity output pairing are associated with a common system call. In embodiments, act 604 has a technical effect of identifying correspondence between two data flow dependency graphs, based at least on a topological ordering of vertices in those graphs.

Method 600 also comprises an act 605 of identifying mismatched output pairs. In some embodiments, act 605 comprises identifying a set of one or more mismatched entity output pairings from the set of entity output pairings, each mismatched entity output pairing in the set being mismatched due at least to a corresponding first value of its corresponding first entity output differing from a corresponding second value of its corresponding second entity output. In an example of act 605, the diffing component 118 utilizes the pairings generated by the pairing component 117 in act 604 in order to find mismatching pairs across the two data flow dependency graphs by, for example, comparing one or more output pairs identified by the pairing component 117 to determine whether or not their corresponding values match. By identifying mismatched output pairs, the efficiency of automated root cause identification (in terms of processing power required and computation time) is improved because those mismatched pairs become the basis for an efficient traversal through the data flow dependency graphs that avoids traversing portions of the graphs not related to differing program behaviors. In addition, in embodiments, act 605 has a technical effect of identifying externally-visible differences between how the entity executed when it was traced in to the first execution trace, versus how the entity executed when it was traced in to the second execution trace.

In some embodiments, method 600 also comprises an act 606 of pruning the graph(s). In some embodiments, act 606 also comprises pruning at least one of the first data flow dependency graph or the second data flow dependency graph. In one example of act 606, the pruning component 120 removes inputs that lack any data flow path to a mismatched output. Thus, in some embodiments, act 606 comprises removing each entity input in the data flow dependency graph that lacks any data flow path to an entity output in the data flow dependency graph that is part of one of the set of mismatched entity output pairings. In another example of act 606, the pruning component 120 removes outputs that match. Thus, in some embodiments, act 606 comprises removing each entity output in the data flow dependency graph that is part of one of the set of entity output pairings, and that is a matched entity output pairing due at least to a corresponding first value of its corresponding first entity output matching a corresponding second value of its corresponding second entity output. In another example of act 606, the pruning component 120 removes downstream mismatching outputs that cascade from an ancestor mismatching output. Thus, in some embodiments, act 606 comprises removing each entity output in the data flow dependency graph that is part of one of the set of one or more mismatched entity output pairings, and whose mismatch is fully attributable to one or more ancestor entity outputs that is also part of the set of one or more mismatched entity output pairings. By pruning the graphs, the efficiency of automated root cause identification (in terms of processing power required and computation time) is improved because pruning the graphs simplifies one (or both) of the data flow dependency graphs, thereby reducing a search space for identifying mismatches, and improving efficiency of the debugging component 109 (e.g., in terms of memory usage, processor usage, etc.). This is particularly the case when pruning the graphs to the root differences using the techniques described above, such that what remains are differences that are not preceded by (i.e., have no incoming edge from) another difference.

Method 600 also comprises an act 607 of topologically identifying input pair(s) as topological root(s) for the output pair(s) that are causal to mismatch(es). In some embodiments, act 607 comprises, for at least one mismatched entity output pairing, traversing each of the first data flow dependency graph and the second data flow dependency graph toward a root of each data flow dependency graph, in order to identify a set of one or more entity input pairings as a topological root to the least one mismatched entity output pairing that is causal to the mismatch of the least one mismatched entity output pairing, each entity input pairing in the set comprising (i) a corresponding first entity input from the first set of entity inputs, and (ii) a corresponding second entity inputs from the second set of entity inputs, and in which the corresponding first entity inputs and the corresponding second entity inputs in each entity inputs pairing have (i) a common label, a (ii) common topological correspondence, and mismatched values. In an example of act 607, the root identification component 119 traverses the data flow dependency graphs—starting at one or more mismatching output pair(s)—in order to find one or more mismatching input pair(s) that (i) are ancestors of those mismatching output pair(s), and that (ii) themselves do not have ancestors that explain the difference in their mismatched input. In embodiments, act 607 has a technical effect of identifying an input difference between the two graphs that is causal to an output difference between the two graphs.

Method 600 also comprises an act 608 of outputting the input pair(s) at root cause(s) for difference(s) between traces. In some embodiments, act 608 comprises returning the set of entity input pairings as a root cause for at least one difference between first execution trace and the second execution trace. In an example of act 608, the output component 121 provides an output of the mismatching input pair(s) identified by the root identification component 119 in act 607 as a root cause for at least one difference between the subject execution traces. As mentioned, in some embodiments the output component 121 also provides an output of a system call chain from a root input to a mismatched output; thus, in some embodiments of act 608 also comprises returning, for at least one of the set of entity input pairings, a system call chain to reach one or more of its corresponding first entity input, or its corresponding second entity input. As mentioned, in some embodiments the output component 121 also provides an indication of the values of the inputs in a root input pair; thus, in some embodiments of act 608 also comprises returning, for at least one of the set of entity input pairings, an indication of a corresponding first value of its corresponding first entity input, and of a corresponding second value of its corresponding second entity input. As mentioned, in some embodiments the output component 121 also provides an indication of the labels of the inputs in a root input pair and/or an indication of the addresses of the inputs in a root input pair; thus, in some embodiments of act 608 also comprises returning, for at least one of the set of entity input pairings, an indication of a corresponding first label or first address of its corresponding first entity input, and of a corresponding second label or second address of its corresponding second entity input. In embodiments, act 608 has a technical effect of causing an output to a user interface (which displays the outputted data), causing an output to another software component (which then operates on that output), and/or causing an output to another computer system (which then operates on that output).

As mentioned, in some embodiments the graph generation component 115 inputs and outputs based on system calls and/or shared memory; thus, in some embodiments of method 600, the graph generation component 115 identifies the first set of entity inputs and the first set of entity outputs from the first execution trace, and identifies the second set of entity inputs and the second set of entity outputs from the second execution trace. In these embodiments, identifying at least one entity input or at least one entity output is based on identifying at least one of, an annotation describing a system call, or a region of shared memory.

As mentioned, in some embodiments the entity being traced is one of a process or a function; thus, in some embodiments of method 600, the first execution trace records execution of a process. In these embodiments, the first and second sets of entity inputs are one or more data values received from one or more system calls, and the first and second sets of entity outputs are one or more data values passed to the one or more system calls. In other embodiments of method 600, the first execution trace records execution of a function. In these embodiments, the first and second sets of entity inputs are one or more data values read by the function that the function did not produce, and the first and second set of entity outputs are one or more data values written the function to memory that is not deallocated by the function.

As mentioned, in some embodiments an entity's inputs comprise any data that comes from the outside of the entity's execution context; thus, in some embodiments of method 600, each of the first set of entity inputs and the second set of entity inputs comprise at least one of: (i) a first input comprising first data produced by a system call that was initiated by the entity; (ii) a second input comprising second data read by the entity from shared memory; (iii) a third input comprising third data read by the entity from an execution context associated with the entity, the third data having been placed into the execution context by an external entity; (iv) a fourth input comprising fourth data read by the entity from a memory-mapped input/output location; or (v) a fifth input comprising fifth data read by the entity from an executable binary.

As mentioned, in some embodiments an entity's outputs comprise data provided by the entity to system calls, and data written to shared memory; thus, in some embodiments of method 600 each of the first set of entity outputs and the second set of entity outputs comprise at least one of: (i) a first output comprising first data input by the entity to a system call; or (ii) a second output comprising second data written by the entity to shared memory.

As mentioned, in some embodiments, for each input or output, the graph generation component 115 identifies a corresponding address; thus, in some embodiments of method 600 each entity input and each entity output also has a corresponding address. Additionally, as mentioned, in some embodiments a label is something that identifies a given input or output; thus, some embodiments of method 600, for least one entity input or at least one entity output, the corresponding label comprises at least one of: a file name, a file offset, a registry key, an object name, a system call name, or parameter name.

Accordingly, at least some embodiments described herein use data flow dependency graph generation, topological sorting, and input/output pairing, to reduce an amount of data that a computer processor analyzes/processes when determining which input(s) are causal to output(s) that differed between execution traces. In particular, the embodiments described herein enable this analysis to only traverse the branches of data flow dependency graphs that are relevant to those outputs in order to efficiently identify a root cause of at least one difference in the execution result of an entity in a manner that efficiently devotes computing resources (e.g., processor time, memory resources) to only a fraction of execution trace that is actually relevant to those differences.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present invention may be embodied in other specific forms without departing from its essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. When introducing elements in the appended claims, the articles "a," "an," "the," and "said" are intended to mean there are one or more of the elements. The terms "comprising," "including," and "having" are intended to be inclusive and mean that there may be additional elements other than the listed elements. Unless otherwise specified, the terms "set," "superset," and "subset" are intended to exclude an empty set, and thus "set" is defined as a non-empty set, "superset" is defined as a non-empty superset, and "subset" is defined as a non-empty subset. Unless otherwise specified, the term "subset" excludes the entirety of its superset (i.e., the superset contains at least one item not included in the subset). Unless otherwise specified, a "superset" can include at least one additional element, and a "subset" can exclude at least one element.

What is claimed:

1. A method, implemented at a computer system that includes a processor, for automated root cause identification using data flow analysis of plural execution traces, the method comprising:
based on accessing a first execution trace that records execution of an entity, (i) generating a first data flow dependency graph that at least represents a first data flow from a first set of one or more entity inputs to a first set of one or more entity outputs through a first set of one or more activities, each entity input in the first set of entity inputs and each entity output in the first set of entity outputs having a corresponding value and a corresponding label; and (ii) generating a first topological sorting for the first data flow dependency graph;
based on accessing a second execution trace that records execution of the entity, (i) generating a second data flow dependency graph that at least represents a second data flow from a second set of one or more entity inputs to a second set of one or more entity outputs through a second set of one or more activities, each entity input in the second set of entity inputs and each entity output in the second set of entity outputs having a corresponding value and a corresponding label; and (ii) generating a second topological sorting for the second data flow dependency graph;
identifying a set of one or more entity output pairings, each entity output pairing in the set comprising (i) a corresponding first entity output from the first set of entity outputs, and (ii) a corresponding second entity output from the second set of entity outputs, and in which the corresponding first entity output and the corresponding second entity output in each entity output pairing have a common label and a common topological correspondence, wherein the topological correspondence is based on the generated topological sortings;
identifying a set of one or more mismatched entity output pairings from the set of entity output pairings, each mismatched entity output pairing in the set being mismatched due at least to a corresponding first value of its corresponding first entity output differing from a corresponding second value of its corresponding second entity output;
for at least one mismatched entity output pairing, traversing each of the first data flow dependency graph and the second data flow dependency graph toward a root of each data flow dependency graph, in order to identify a set of one or more entity input pairings as a topological root to the least one mismatched entity output pairing that is causal to the mismatch of the least one mismatched entity output pairing, each entity input pairing in the set comprising (i) a corresponding first entity input from the first set of entity inputs, and (ii) a corresponding second entity inputs from the second set of entity inputs, and in which the corresponding first entity inputs and the corresponding second entity inputs in each entity inputs pairing have (i) a common label, a (ii) common topological correspondence, and mismatched values; and
returning the set of entity input pairings as a root cause for at least one difference between first execution trace and the second execution trace.

2. The method of claim 1, wherein each data flow dependency graph is a directed acyclic graph in which each directed edge connects a corresponding first vertex representing either an input or an output and a corresponding second vertex representing a corresponding activity, and in which,
when the directed edge is directed from the corresponding first vertex to the corresponding second vertex, the corresponding first vertex represents an input to the corresponding activity; or
when the directed edge is directed from the corresponding second vertex to the corresponding first vertex, the corresponding first vertex represents an output from the corresponding activity.

3. The method of claim 1, wherein each data flow dependency graph is a directed acyclic graph, in which each directed edge is directed from a corresponding first vertex representing a corresponding first activity to a corresponding second vertex representing a corresponding second activity, and in which the directed edge represents an output from the corresponding first activity and an input to the corresponding second activity.

4. The method of claim 1, further comprising identifying the first set of entity inputs and the first set of entity outputs from the first execution trace, and identifying the second set of entity inputs and the second set of entity outputs from the second execution trace, and wherein identifying at least one entity input or at least one entity output is based on identifying at least one of,
an annotation describing a system call; or
a region of shared memory.

5. The method of claim 1, further comprising pruning at least one of the first data flow dependency graph or the second data flow dependency graph, including performing at least one of:
removing each entity input in the data flow dependency graph that lacks any data flow path to an entity output in the data flow dependency graph that is part of one of the set of mismatched entity output pairings;
removing each entity output in the data flow dependency graph that is part of one of the set of entity output pairings, and that is a matched entity output pairing due at least to a corresponding first value of its corresponding first entity output matching a corresponding second value of its corresponding second entity output; or
removing each entity output in the data flow dependency graph that is part of one of the set of one or more mismatched entity output pairings, and whose mismatch is fully attributable to one or more ancestor entity outputs that is also part of the set of one or more mismatched entity output pairings.

6. The method of claim 1, wherein,
the first execution trace records execution of a process, and the first set of entity inputs are one or more data values received from one or more system calls, and the first set of entity outputs are one or more data values passed to the one or more system calls; or
the first execution trace records execution of a function, and the first set of entity inputs are one or more data values read by the function that the function did not produce, and the first set of entity outputs are one or more data values written the function to memory that is not deallocated by the function.

7. The method of claim 1, wherein each of the first set of entity inputs and the second set of entity inputs comprise at least one of:

(i) a first input comprising first data produced by a system call that was initiated by the entity;
(ii) a second input comprising second data read by the entity from shared memory;
(iii) a third input comprising third data read by the entity from an execution context associated with the entity, the third data having been placed into the execution context by an external entity;
(iv) a fourth input comprising fourth data read by the entity from a memory-mapped input/output location; or
(v) a fifth input comprising fifth data read by the entity from an executable binary.

8. The method of claim 1, wherein each of the first set of entity outputs and the second set of entity outputs comprise at least one of:
(i) a first output comprising first data input by the entity to a system call; or
(ii) a second output comprising second data written by the entity to shared memory.

9. The method of claim 1, wherein each entity input and each entity output also has a corresponding address.

10. The method of claim 1, wherein, for least one entity input or at least one entity output, the corresponding label comprises at least one of: a file name, a file offset, a registry key, an object name, a system call name, or parameter name.

11. The method of claim 1, wherein the first entity outputs and the second entity outputs in each entity output pairing are associated with a common system call.

12. The method of claim 1, wherein the first topological sorting for the first data flow dependency graph is generated based on the first set of entity outputs, and the second topological sorting for the second data flow dependency graph is generated based on the second set of entity outputs.

13. The method of claim 1, further comprising also returning, for at least one of the set of entity input pairings, a system call chain to reach one or more of its corresponding first entity input, or its corresponding second entity input.

14. The method of claim 1, further comprising also returning, for at least one of the set of entity input pairings, an indication of a corresponding first value of its corresponding first entity input, and of a corresponding second value of its corresponding second entity input.

15. The method of claim 1, further comprising also returning, for at least one of the set of entity input pairings, an indication of a corresponding first label or first address of its corresponding first entity input, and of a corresponding second label or second address of its corresponding second entity input.

* * * * *